(12) United States Patent
Choe et al.

(10) Patent No.: US 7,510,688 B2
(45) Date of Patent: Mar. 31, 2009

(54) STACK TYPE REACTOR

(75) Inventors: Jae Hoon Choe, Daejeon (KR); Jung Uk Choi, Daejeon (KR); Young Woon Kwon, Daejeon (KR); Kwang Cheon Park, Daejeon (KR); Jung Hyun Seo, Daejeon (KR); Jun Yeon Cho, Daejeon (KR); Yoo Seok Kim, Daejeon (KR); Kwang Ho Song, Gyeonggi-do (KR)

(73) Assignee: LG Chem, Ltd., Seoul (KR)

( * ) Notice: Subject to any disclaimer, the term of this patent is extended or adjusted under 35 U.S.C. 154(b) by 281 days.

(21) Appl. No.: 11/526,723

(22) Filed: Sep. 26, 2006

(65) Prior Publication Data

US 2007/0081923 A1 Apr. 12, 2007

(30) Foreign Application Priority Data

Sep. 26, 2005 (KR) .................. 10-2005-0089301
Sep. 22, 2006 (KR) .................. 10-2006-0092127

(51) Int. Cl.
*B01J 8/02* (2006.01)
*B01J 8/04* (2006.01)
*B01F 5/06* (2006.01)
*B01F 13/00* (2006.01)

(52) U.S. Cl. .................. 422/211; 422/188; 422/190; 422/191; 422/220; 422/222; 422/224; 422/50; 422/100; 422/102; 422/130; 366/336; 366/338; 366/341

(58) Field of Classification Search ................. 422/188, 422/211, 220, 222, 224, 190, 191, 130, 50, 422/99, 100, 102; 366/336, 338, 341
See application file for complete search history.

(56) References Cited

U.S. PATENT DOCUMENTS 5,826,981 A * 10/1998 Fowler et al. ............... 366/337
2002/0168308 A1 * 11/2002 Loffler et al. ............... 422/211

* cited by examiner

*Primary Examiner*—Walter D Griffin
*Assistant Examiner*—Lessanework Seifu
(74) *Attorney, Agent, or Firm*—McKenna Long & Aldridge LLP

(57) ABSTRACT

A stack type reactor that can adjust a length of channel (reaction time) to react raw substances with each other for a sufficient time and mix completely raw substances to maximize the reaction efficiency. The stack type reactor comprises an upper block with at least two inlets that introduce different kinds of raw substances and a lower channel fluidly connected to the inlets and formed at a lower surface thereof; a unit block including an upper channel corresponding to the lower channel of the upper block and formed on an upper surface thereof, the unit block including a lower channel formed at a lower surface thereof and fluidly connected with the upper channel via a connecting flow passage. The upper block and unit block form a flow path for the raw substances by connecting to the lower channel of the upper block to the upper channel of the unit block.

19 Claims, 5 Drawing Sheets

STACK TYPE REACTOR

BACKGROUND OF THE INVENTION

This application claims the benefit of Korean Patent Application Nos. 10-2005-0089301 and 10-2006-0092127 filed Sep. 26, 2005 and Sep. 22, 2006 respectively in Korea, which are hereby incorporated by reference in their entirety.

FIELD OF THE INVENTION

The present invention relates to a reactor, particularly relates to a reactor which can adjust a reaction time and a length of channel and mix sufficiently raw substances to maximize the reaction efficiency.

DESCRIPTION OF THE RELATED ART

In general, the reactor in which two kinds of raw substances or more are contacted (or mixed) and reacted with each other to generate resulting reactant has a channel through which raw substance is flowed. In a process of flowing of raw substances along the channel, the raw substances are contacted and mixed with each other to be chemically reacted, as a result of this reaction, the resulting reactant is obtained.

A conventional reactor comprises inlets through which raw substances are entered respectively, a channel connected to the inlets and acting as a flow passage through which raw substances are flowed and an outlet connected to the channel and discharging the resulting reactant.

In the reactor having the structure as described above, a discharge of the resulting reactant and the reaction of raw substances are simultaneously occurred, and so it is difficult to react completely raw substances according to the kind of substance material. That is, raw substances differ from each other in a reaction time according to the kind thereof, therefore, a reaction time (that is, a contacting/mixing time) should be determined differently according to the kind of raw substance.

In the structure in which a distance between the inlet and the outlet is limited, however, all raw substances (in particular, raw substances requiring a long reaction time) are reacted for a time which is uniformly limited so that a complete reaction between raw substances can not be obtained.

In addition, in the conventional reactor, since raw substances are merely flowed along the channel, it is difficult to expect that raw material substances are sufficiently contacted/mixed with each other. As a result, there is a problem in that it is difficult to obtain the complete resultant.

SUMMARY OF THE INVENTION

The present invention is conceived to solve the above problems generated in the reactor, an object of the present invention is to provide a reactor which can adjust a length of channel (that is, a reaction time) according to the kind of raw substance to make raw substances be reacted with each other for a sufficient time.

Another object of the present invention is to provide the stack type reactor which can mix completely raw substances to maximize the reaction efficiency thereof.

Yet another object of the present invention is to provide the stack type reactor which can inhibit sediments formed at the time of reacting the raw substances from being accumulated on a channel (flow passage) to maintain smoothly a flow of raw substance (or resulting reactant).

In order to achieve the above objects, the stack type reactor according to the present invention comprises an upper block including at least two inlets through which different kinds of raw substances are entered and a lower channel communicated in fluid with the inlets and formed a lower surface thereof; and an unit block including an upper channel corresponding to the lower channel of the upper block and formed on an upper surface thereof, the unit block including a lower channel formed a lower surface thereof and communicated in fluid with the upper channel via a connecting flow passage penetrating therethrough. The upper block and the unit block are coupled with each other to form a flow passage acting as a flow path of the raw substances by corresponding to the lower channel of the upper block and the upper channel of the first unit block.

In the stack type reactor of the present invention, the upper block further comprises at least two connecting channels connecting each inlet and the lower channel, and the unit block further comprises at least tow connecting channel corresponding to the connecting channels of the upper block, each connecting channel has a width gradually decreased from the inlet toward the upper channels of the unit block and the upper block.

Also, the stack type reactor of the present invention further comprises a flow rate adjusting member provided at an outlet of flow passage formed by one of the connecting channel of the upper block and the corresponding connecting channel of the unit block for increasing a flow rate of raw substance which is flowed at a lower flow rate.

The stack type reactor of the present invention can further comprises at least one auxiliary unit block having an upper channel formed on an upper surface thereof and corresponding to a lower channel formed on a lower surface of the neighboring block and a lower channel communicated in fluid with the upper channel thereof via a connecting flow passage. Here, the flow passage of the auxiliary unit block is formed at one end of the channel opposite to an end of the channel of the neighboring unit block at which the flow passage is formed.

In the stack type reactor of the present invention, each of the upper channel and the lower channel of each unit block comprises a plurality of linear channels and bent channels connecting two neighboring linear channels, each bent channel consists of a first and second branch channels diverged from one linear channel, the branch channels are extended at a certain interval and joined at the other linear channel through outlets.

Also, the first branch channel of the upper channel of each block is divided into an upward inclined area from the adjacent linear channel to a bending point and a flat area from the bending point to another adjacent linear channel, the flat area has a protrusion formed at a portion thereof, the branch channel of the lower channel of another block corresponding the upper channel of each unit block is divided into an upward inclined area corresponding the upward inclined area of the first branch channel of the upper channel and a downward declined area corresponding to the flat area, the second branch channel of the upper channel of each unit block is divided into a downward inclined area from the adjacent linear channel to a bending point and a upward inclined area from the bending point to another adjacent linear channel, and the branch channel of the lower channel of another block corresponding the upper channel of each unit block is divided into a downward inclined area corresponding the downward inclined area of the second branch channel of the upper channel and a flat area corresponding to the upward inclined area of the second branch channel, the flat area has a protrusion formed at a portion thereof.

An inlet of each branch channel has a width which is a half of a width of the corresponding linear channel, an outlet of each branch channel has a width which is the same as that of the corresponding linear channel, the outlet of the first branch channel corresponds to an upper side of the corresponding linear channel and the outlet of the second branch channel corresponds to the corresponding linear channel.

In particular, the branch channel of each bent channel constituting the lower channel of each block has a structure which is vertically and bilaterally symmetrical with that of the corresponding branch channel of the bent channel constituting the upper channel.

In the stack type reactor of the present invention, the flow passage formed by the upper channel and the lower channel of two coupled blocks comprises at least two integral flow passages and at least one connecting flow passage connecting two integral flow passages, the connecting flow passage consists of a first and second branch flow passages diverged from one integral flow passage, the first and second branch flow passages are extended at a certain interval and outlets of two branch flow passages are joined at the other liner flow passage.

In the flow passage, the first branch flow passage has a shape such an area between an inlet and the bent point is upward inclined and an area between the bent point and an outlet is downward inclined, the second branch flow passage has a shape such an area between an inlet and the bent point is downward inclined and an area between the bent point and an outlet is upward inclined.

Also, in the flow passage, each of the first and second branch flow passages has an inlet connected to one linear flow passage and having a width which is a half of a width of the conned linear flow passage, an outlet connected to the other linear flow passage and having a width which is the same as that of the connected linear flow passage, and the outlet of the first branch flow passage corresponds to an upper side of the corresponding linear flow passage and the outlet of the second branch flow passage corresponds to the corresponding linear passage such that the outlet of the second branch flow passage is placed below the outlet of the first flow passage.

BRIEF DESCRIPTION OF THE DRAWINGS

These and other features, aspects and advantages of the present invention will become better understood with regard to the following description, appended claims, and accompanying drawings wherein:

DETAILED DESCRIPTION OF THE INVENTION

Hereinafter, the preferred embodiments of the present will be described in detail with reference to the accompanying drawings.

Figure 1:
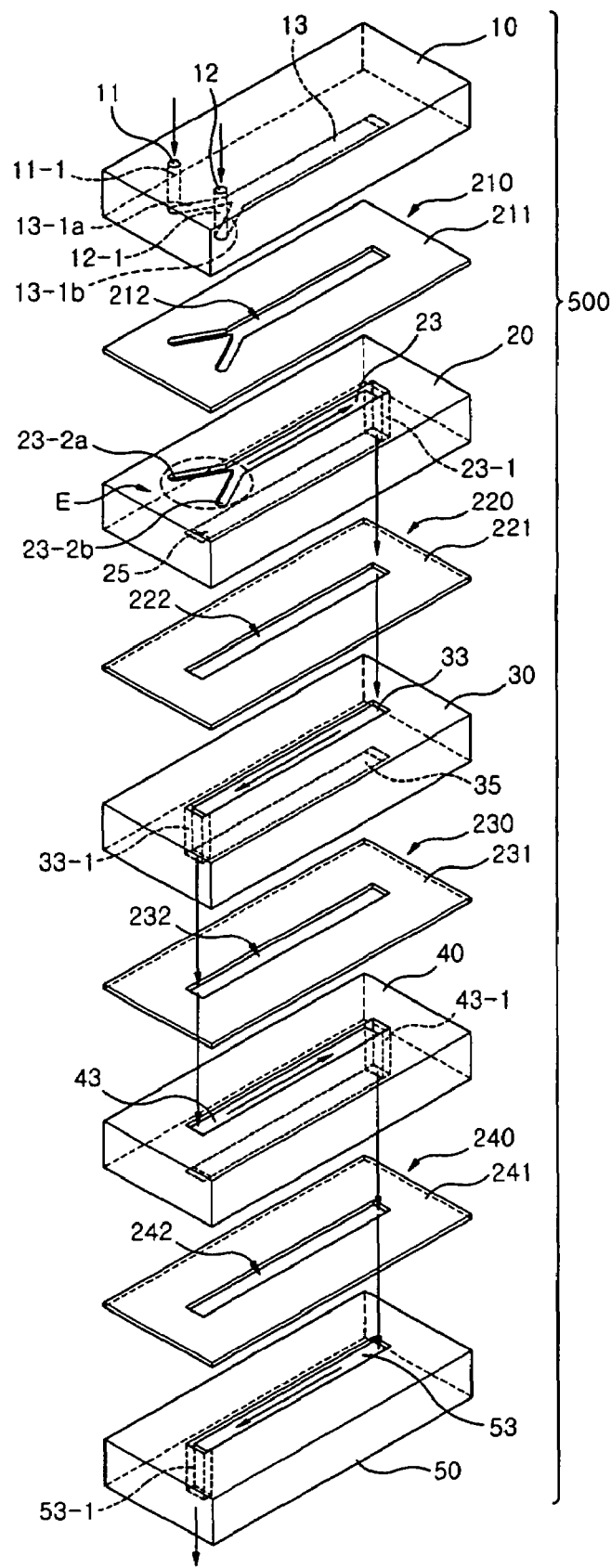
FIG. 1 is an exploded perspective view showing blocks constituting the reactor according to the first embodiment of the present invention.

FIG. 1 is an exploded perspective view showing respective block constituting the stack type reactor according to the first embodiment of the present invention, the stack type reactor 500 according to this embodiment comprises an upper block 10 and a plurality of unit blocks 20, 30, 40 and 50.

At least two inlets 11 and 12 are formed on one side of the upper block 10, raw substances are introduced into the inlets, respectively. Flow passages 11-1 and 12-1 extended from the inlets 11 and 12 penetrate the upper block 10, and an end of each flow passage corresponds to a lower surface of the upper block.

A channel 13 with a certain depth and length is formed on a lower surface of the upper block 10. Connecting channels 13-1a and 13-1b are formed at one end of the channel 13 for connecting the flow passages 11-1 and 12-1 and the channel 13.

An upper surface of the first unit block 20 placed below the upper block 10 has the same configuration as that of a lower surface of the upper block 10. That is, an upper channel 23 with a certain depth and length is formed on an upper surface of the first unit block 20. Also, connecting channels 23-2a and 23-2b corresponding to the connecting channels 13-1a and 13-1b of the upper block 10 are formed at a first end of the upper channel 23.

Accordingly, if the upper block 10 and the first unit block 20 are coupled to each other through a coupling means (not shown), the channel 13 and the connecting channels 13-1a and 13-1b of the upper block 10 correspond to the upper channel 23 and connecting channels 23-2a and 23-2b of the first unit block 20, respectively, and so a closed type flow passage having both opened ends is formed between the both blocks 10 and 20.

Here, a second end of the upper channel 23 formed on an upper surface of the first unit block 20 corresponds to a connecting passage 23-1 which penetrates vertically the first unit block 20.

On the other hand, a lower channel 25 with a certain depth and length is formed on a lower surface of the first unit block 20. For simplifying the drawing, the lower channel 25 is illustrated in the form of a plane.

A second end of the lower channel 25 corresponds to the connecting passage 23-1 penetrating the second block 20. Accordingly, the upper channel 23 and the lower channel 25 of the first unit block 20 are communicated with each other via the connecting passage 23-1.

The upper block 10 and the first unit block 20 as described above are minimum structural elements required for constituting the stack type reactor according to the present invention. In addition to the above blocks, the second unit block 30, the third unit block 40 and the fourth unit block 50 (the auxiliary blocks) can be mounted to a lower side of the first unit block 20 as can be seen from FIG. 1.

On the other hand, each of the second unit block 30, the third unit block 40 and the fourth unit block 50 has the same structure, and so only the structure of the second unit block 30 will be described below for the sake of convenience. Also, in FIG. 1, channels 13, 23, 33, 43 and 53 formed on a lower surface of the upper block 10 and both surfaces of each of the unit blocks 20, 30, 40 and 50 are shown in the shape of a straight line, a detail shape of each channel will be concretely described with reference to FIG. 3, FIG. 4 and FIG. 5.

As shown in FIG. 1, an upper surface of the second unit block 30 placed below the first unit block 20 has the same structure as that of a lower surface of the first unit block 20.

That is, an upper channel 33 with a certain depth and length is formed on an upper surface of the second block 30, both ends of the upper channel 33 correspond to both ends of the lower channel 25 of the first unit block 20.

Accordingly, if the first unit block 20 and the second unit block 30 are coupled to each other through a coupling means (not shown), the lower channel 25 of the first unit block 20 corresponds to the upper channel 33 of the second unit block 30, and so a closed type flow passage having both opened ends is formed between the both blocks 20 and 30.

Here, a first end of the upper channel 33 formed on an upper surface of the third unit block 30 corresponds to a connecting passage 33-1 which penetrates vertically the third unit block 30.

On the other hand, a lower channel 35 with a certain depth and length is formed on a lower surface of the second unit block 30. A first end of the lower channel 35 corresponds to the connecting passage 33-1 penetrating the third block 30. Accordingly, the upper channel 33 and the lower channel 35 of the second unit block 30 are communicated with each other via the connecting passage 33-1.

In the stack type reactor consisting of the upper block 10 and the first unit block 20 as described above, the connecting passage 23-1 of the first block 20 functions as an outlet through which the resulting reactant is discharged, and in the stack type reactor consisting of the upper block 10, the first unit block 20 and the second unit block 30, the connecting passage 33-1 of the second block 30 acts as an outlet through which the resulting reactant is discharged.

Also, in the reactor consisting of the upper block 10, the first unit block 20, the second unit block 30, the third unit block 40 and the fourth unit block 50 as shown in FIG. 1, a connecting passage 53-1 of the fourth block 50 functions as an outlet through which the resulting reactant is discharged.

As described above, in addition to the flow passage with a certain length formed by two blocks 10 and 20, the flow passage with the same length is additionally connected every time the unit block 30, 40 or 50 is additionally mounted to the above two blocks.

On the other hand, for facilitating to understand, a flow of raw substance (or the resulting reactant) flowed along the flow passage formed by the blocks is indicated by the arrow in FIG. 1.

As described above, by selecting the number of the blocks 10, 20, 30, 40 and 50 to be mounted according to the raw substance, it is possible to adjust a length of the flow passage which is a flow path of the raw substance. Accordingly, the reaction between the raw substances can be carried out for a sufficient time.

Below, a structure of the flow passage formed by the upper channel 23 of the first unit block 20 and the channel 13 formed on a lower surface of the upper block 10 is illustrated with reference to FIG. 2.

Figure 2:
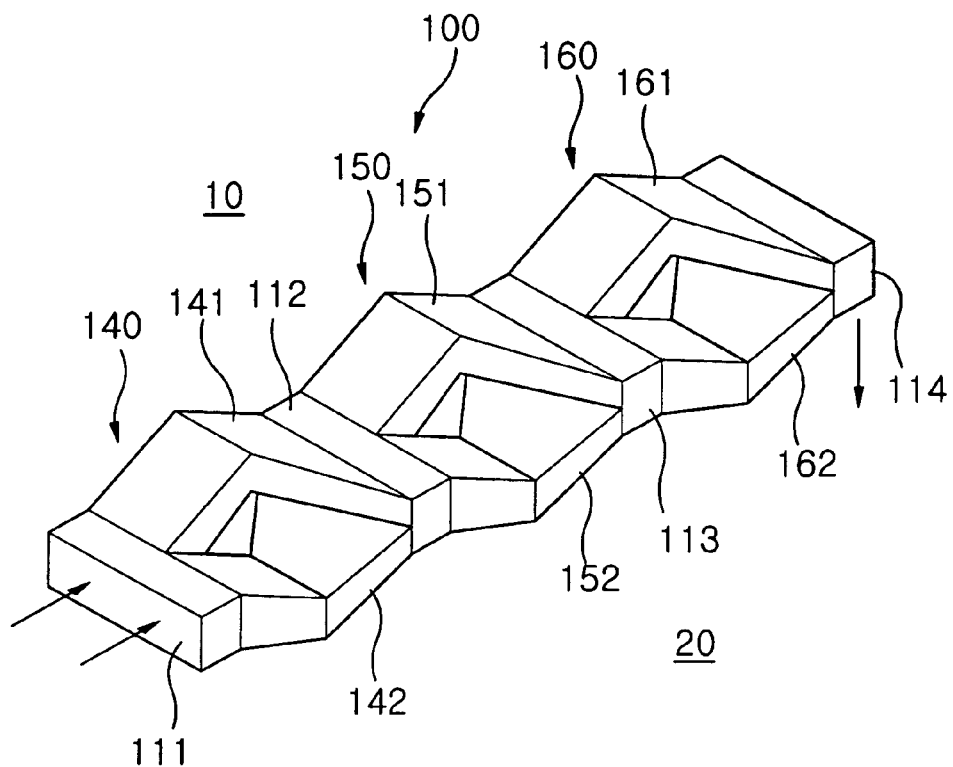
FIG. 2 is a conceptual view for illustrating a flow passage formed between an upper block and a first unit block shown in FIG. 1.

FIG. 2 is a perspective view showing a flow passage formed at an interface of the first unit block 20 and the upper block 10 when the two blocks 10 and 20 are coupled with each other. For convenience's sake, a flow passage 100 is shown in the form of a box.

Here, configurations of the upper block 10 and the first unit block 20 adopted for forming the flow passage 100 shown in FIG. 2, that is, a detailed configuration of the channels will be described later.

On the other hand, the flow passage which is the same as that shown in FIG. 2 is also formed at the interface between the first unit block 20 and the second unit block 30, the interface between the second unit block 30 and the third unit block 40, and the interface between the third unit block 40 and the fourth unit block 50, respectively. However, a flow direction of the raw substances (or the resulting reactant) flowed along the flow passage differ from that flowed along the neighboring flow passages.

A flow passage 100 shown in FIG. 2 is formed by the channel 13 on a lower surface of the upper block 10 and the upper channel 23 on an upper surface of the first unit block 20, this flow passage comprises a plurality of integral flow passages 111, 112, 113 and 114 including integral flow passages 111 and 114 formed at both ends and a plurality of connecting flow passages 140, 150 and 160 connecting two adjacent integral flow passages, respectively.

The first connecting flow passage 140 connecting the first integral flow passage 111 and the second integral flow passage 112 consists of a first branch flow passage 141 and a second branch flow passage 142. On the other hand, the first integral flow passage 111 is communicated in fluid with the inlets 11 and 12 formed on the upper block 10 via the connecting channels 13-1a, 13-1b and 23-2a, 23-2b shown in FIG. 1.

Inlets (that is, portions corresponding to the first integral flow passage 111) of two branch flow passages 141 and 142 are connected side be side to the first integral flow passage 111, and outlets (that is, portions corresponding to the second integral flow passage 112) of two branch flow passages 141 and 142 are overlapped each other and connected to the second integral flow passage 112.

That is, a width of each inlet of the branch flow passages 141 and 142 is an approximately half of that of the first integral flow passage 111, and a width of each outlet of the branch flow passages 141 and 142 is the same as that of the second integral flow passage 112.

On the other hand, the branch flow passages 141 and 142 are formed such that central portions of the branch flow passages are bent in the opposite directions. That, a central portion of one branch flow passage (for example, 141) is placed above the integral flow passages 111 and 112, and the other branch flow passage (for example, 142) is placed below the integral flow passages 111 and 112.

As shown in FIG. 2, the above configuration is applied to branch flow passages 151, 152 and 161, 162 constituting other connecting flow passages 150 and 160.

Two kinds of raw substances or more introduced through the inlets 11 and 12 of the upper block 10 shown in FIG. 1 are contacted/mixed and reacted first with each other in the first integral flow passage 111 and then entered into the first connecting flow passage 140.

That is, the raw substances (which is already mixed first) discharged from the first integral flow passage 111 are divided right and left and entered into two branch flow passages 141 and 142. Thereinafter, the raw substances are mixed and reacted with each other when the raw substances are flowed upward and downward in each of two branch flow passages 141 and 142.

The mixed raw substances discharged from the branch flow passages 141 and 142 of the first connecting flow passage 140 are entered in the second integral flow passage 112 in a state that the raw substances discharged from the first branch flow passage 141 and the raw substances discharged from the second branch flow passage 142 are overlapped vertically. Accordingly, the raw substances are mixed and reacted more completely.

The above processes for the raw substances discharged from the second integral flow passage 112 are performed in two branch flow passages 151 and 152 of the second connecting flow passage 150, the third integral flow passage 113 and two branch flow passages 161 and 162 of the third connecting flow passage 160, and so the raw substances are repeatedly mixed and reacted.

The raw substances discharged from the fourth integral flow passage 114 is entered in a flow passage formed between the first unit block 20 and the second unit block 30 shown in FIG. 1 (that is, formed by the lower channel 25 of the first unit block 20 and an upper channel 33 of the second unit block 30) and then passed again through the process which is the same as the process as described above.

On the other hand, resulting reactant generated by the reaction performed for a sufficient time is introduced and stored in an external storage facility (not shown).

Here, although FIG. 2 and the above description illustrate that the flow passage 100 formed by two blocks 10 and 20 consists of four (4) integral flow passages 111, 112, 113 and 114 and three connecting flow passages 140, 150 and 160, each of which being formed between two integral flow passages, the present invention is not limited thereto. That is, a length of the entire flow passage and the number of the integral flow passages and the connecting flow passages constituting the flow passage should be determined according to a kind of the reacting equipment, a width and length of each flow passage, a kind and physical characteristic (for example, viscosity etc. ) of raw substances.

As described above, while the raw substances are flowed in the flow passage 100 formed by two blocks, in particular, a plurality of integral flow passages 111, 112 and 113 and a plurality of connecting flow passages 140, 150 and 160 (that is, the branch flow passages), the processes of a right/left division caused by the branch flow passages, an upward/downward movement caused by a shape of the branch flow passage and mixture of the raw substances are carried out repeatedly several time, and so two kinds of raw substances are sufficiently contacted and mixed with each other and then completely reacted.

Here, a catalyst layer can be formed on a surface of the channel of respective block for promoting a reaction of the raw substances. The material used for forming the catalyst layer can be selected from various materials according to the raw substance, and so a description thereon is omitted in this specification.

On the other hand, the reference numerals "210", "220", "230" and "240" indicate gaskets which are placed between two blocks, respectively. As described previously, two blocks, for example, the upper block 10 and the first unit block 20 are coupled with each other by a coupling means (not shown), and so the flow passage 100 (in FIG. 2) is formed by the channels 13 and 23 formed on the corresponding surfaces of the blocks 10 and 20.

A micro space is formed between the upper block 10 and the first unit block 20 which are coupled to each other in a state that plane surfaces thereof corresponds to each other, and so the raw substances flowed in the channels 13 and 23 formed in the shape of recess can be leaked to an exterior through this micro space.

In order to prevent the above problem from being occurring, each of the gaskets 210, 220, 230 and 240 is placed between two unit blocks.

Planar members 211, 221, 231 and 241 constituting the gaskets 210, 220, 230 and 240 have openings 212, 222, 232 and 242 corresponding to the channels (for example, 13, 23, 25 and 33) of the blocks 10, 20, 30, 40 and 50, respectively. Accordingly, the channels of the blocks 10, 20, 30, 40 and 50 are communicated with the corresponding channel(s) of the neighboring block(s) through the openings 212, 222, 232 and 242, and so the gaskets 210, 220, 230 and 240 do not affect the formation of the flow passages.

If two blocks, for example, the upper block 10 and the first unit block 20 are coupled in a stat that the gasket 210 is placed between two blocks, although a space is existed between the blocks 10 and 20, the flow passage 100 is completely sealed by the gasket 210. Accordingly, the raw substance flowed in the flow passage 100 is (that is, the channels) is not leaked out of the blocks.

Below, a structure of the channel formed on a surface of each block which forms the flow passage 100 when two blocks correspond to each other is described. For the sake of convenience, the channel 13 formed on the first unit block 20 shown in FIG. 1 is described as an example.

Figure 3:
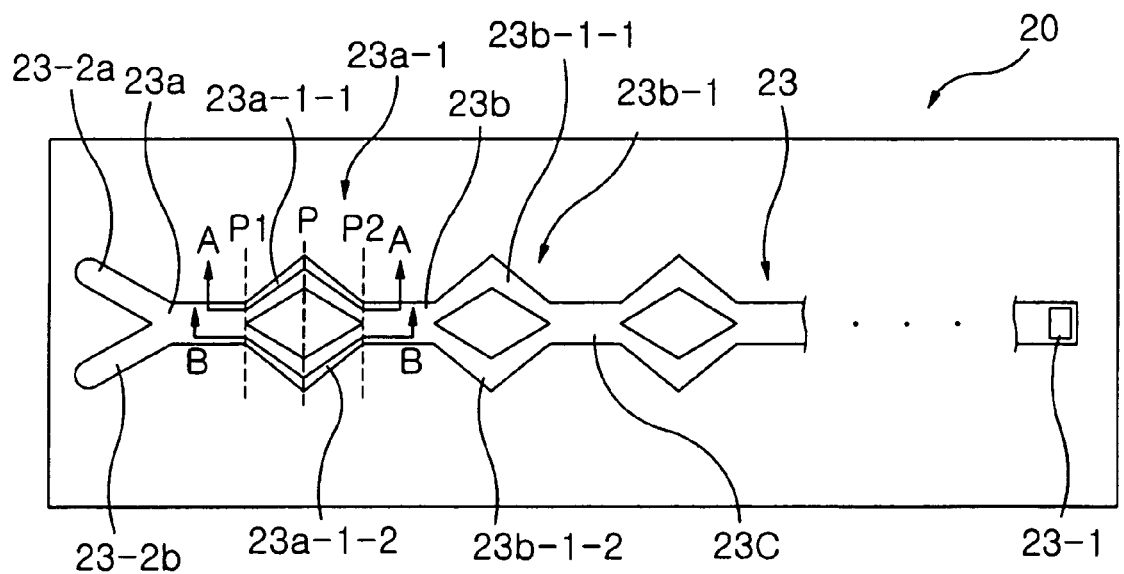
FIG. 3 is a plane view of the first unit block shown in FIG. 1.
Figure 4:
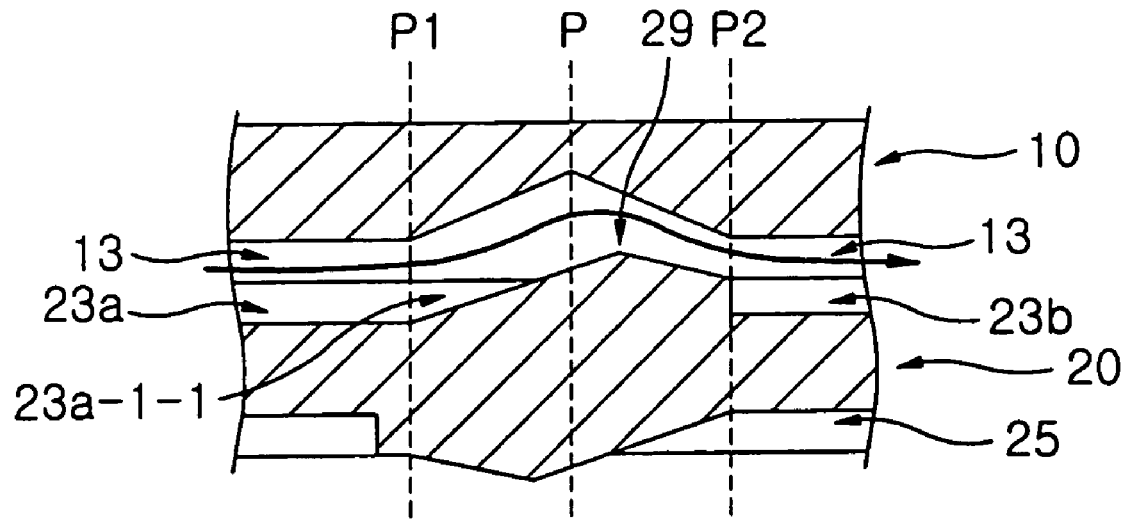
FIG. 4 and FIG. 5 are sectional views taken along the line A-A and the line B-B of FIG. 3 and showing a portion of the upper block.
Figure 5:
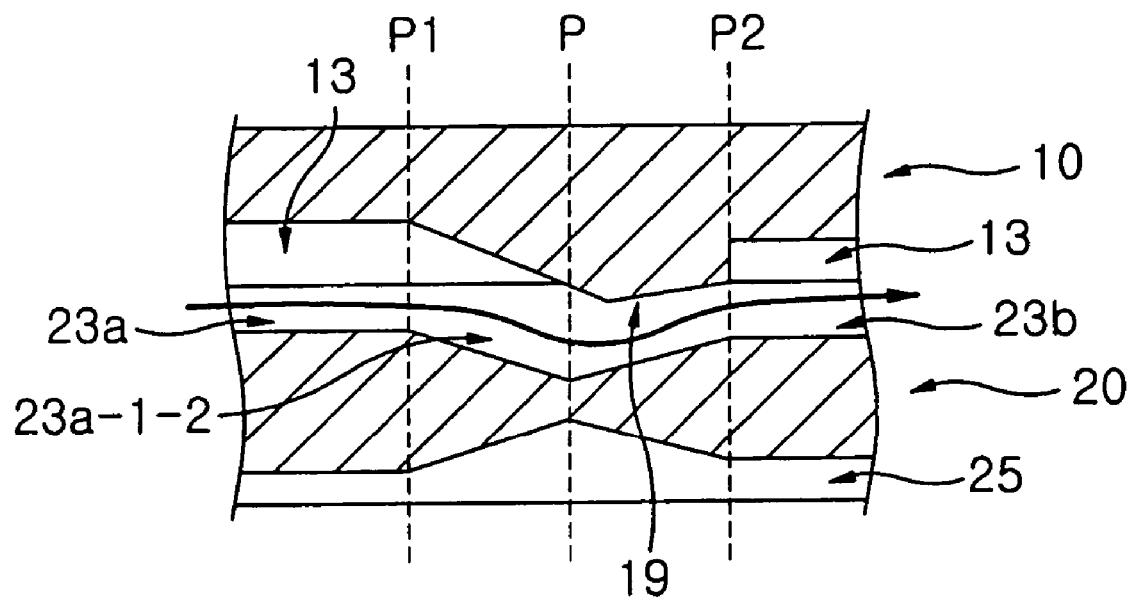

FIG. 3 is a plane view of the first unit block shown in FIG. 1, FIG. 4 and FIG. 5 are sectional views taken along the line A-A and the line B-B of FIG. 3. In FIG. 4 and FIG. 5, a configuration of the first unit block 20, that is, the upper channel 23 formed on an upper surface of the first unit blocks 20 is illustrated and the thick solid arrow indicates a flow of the raw substance.

On the other hand, for illustrating more clearly the flow passage 100, a portion of the upper block 10 placed on the first unit block 20 and constituting the flow passage 100 together with the first unit block is shown in FIG. 4 and FIG. 5.

As described above, the connecting channels 23-2a and 23-2b and the upper channel 23 are formed on an upper surface of the first unit block 20. The connecting passage 23-1 penetrating the second unit block 20 is formed at one end portion of the upper channel 23.

The channel 23 between the connecting channel 23-2a (and 23-2b) and the connecting passage 23-1 is classified into a plurality of linear channels including a first, second and third linear channels 23a, 23b and 23c and a plurality of bent channels 23a-1, 23b-1 connecting two neighboring linear channels.

Here, the linear channels 23a, 23b and 23c form the integral passages 111, 112 and 113 shown in FIG. 2, and the bent channels 23a-1 and 23b-1 form the connecting flow passages 140 and 150.

On the other hand, the connecting channels 23-2a and 23-2b are formed on only the first unit block 20 corresponding to the upper block 10 as shown in FIG. 1.

Below, only the first and second linear channels 23a and 23b and one bent channel 23a-1 connecting the above linear channels 23a and 23b constituting the upper channel 23 of the first unit block 20 are illustrated as an example.

As shown in FIG. 3, the bent channel 23a-1 is divided into a first and second branch channels 23a-1-1 and 23a-1-2 diverged from the first linear channel 23a.

The first and second branch channels 23a-1-1 and 23a-1-2 are extended from the first linear channel 23a in an outward direction, respectively. Also, each of the branch channels 23a-1-1 and 23a-1-2 is bent inward at a central portion thereof, and a rear portion of each branch channel is extended toward the second linear channel 23b . Consequently, end portions of the first and second branch channels 23a-1-1 and 23a-1-2 join at the second linear channel 23b.

As shown in FIG. 4, the first branch channel 23a-1-1 is divided into an upward inclined area (P1~P) from the first linear channel 23a to a bending point P and a flat area (P~P2) from the bending point P to the second linear channel 23b . The flat portion (P~P2) is the same level with an upper surface of the first unit block 20. Here, a protrusion 29 with a certain height is formed between the bending point P and the second linear channel 23b, that is, on the flat portion (P~P2).

On the other hand, the lower channel 13 of the upper block 10 corresponding to the upper channel 23 of the first unit block 20 has the same configuration as that of the upper channel 25. In the lower channel 13, however, a portion corresponding the upward inclined area (P1~P) of the first branch channel 23a-1-1 is inclined upward, and a portion corresponding to the flat area (P~P2) is inclined downward.

Consequently, the flow passage (the first branch flow passage 141 in FIG. 2) formed by the first branch channel 23a-1-1 of the first unit block 20 makes the raw substance flowed therein move upward and downward as indicated by the arrow.

Here, a width of an inlet (at the point P1 corresponding to the first linear channel 23a) of the first branch channel 23a-1-1 is approximately half of that of the first linear channel 23a, and a width of outlet (at the point P2 corresponding to the second linear channel 23b) is the same as that of the second linear channel 23b.

As shown in FIG. 5, the first branch channel 23a-1-2 is divided into a downward inclined area (P1~P) from the first linear channel 23a to a bending point P and an upward inclined area (P~P2) from the bending point P to the second linear channel 23b.

On the other hand, the lower channel 13 of the upper block 10 corresponding to the upper channel 23 of the first unit block 20 has the same structure as that of the upper channel 25. In the lower channel 13, however, a portion corresponding the downward inclined area (P1~P) of the first branch channel 23a-1-1 is inclined downward, and a portion corresponding to the upward inclined area (P~P2) has a flat surface. The flat portion (P~P2) is the same level with a lower surface of the first unit block 20. Here, a protrusion 19 with a certain height is formed between the bending point P and the second linear channel 23b, that is, on the flat portion (P~P2).

Consequently, the flow passage (the first branch flow passage 142 in FIG. 2) formed by the second branch channel 23a-1-2 of the first unit block 20 makes the raw substance flowed therein move downward and upward as indicated by the arrow.

Here, a width of an inlet (at the point P1 corresponding to the first linear channel 23a) of the second branch channel 23a-1-2 is approximately half of that of the first linear channel 23a, and a width of outlet (at the point P2 corresponding to the second linear channel 23b) is the same as that of the second linear channel 23b.

As shown in FIG. 4, on the other hand, an outlet (that is, the flat area) of the first branch channel 23a-1-1 corresponding to the second channel 23b corresponds to an upper side of the flow passage (112 in FIG. 2) formed by the lower channel 13 of the upper block 10 and the second channel 23b of the first unit block 20, and so the raw substances discharged from the first branch channel 23a-1-1 is entered in the upper side of the flow passage.

On the contrary, as shown in FIG. 5, an outlet of the second branch channel 23a-1-2 corresponding to the second channel 23b corresponds to a lower side of the flow passage (112 in FIG. 2) formed by the lower channel 13 of the upper block 10 and the second channel 23b of the first unit block 20, and so the raw substances discharged from the second branch channel 23a-1-2 is entered in the lower side of the flow passage.

Consequently, due to the above structure of the branch channels, the raw substances discharged from the first branch flow passage 141 and the second branch flow passage 142 shown in FIG. 2, respectively, can be entered in the second integral flow passage 112 in (see FIG. 2) in the vertical stack state. The raw substance in the second integral flow passage is then divided right and left and entered into the adjacent two branch flow passages 151 and 152 (see FIG. 2).

A configuration of the channel 13 formed on a lower surface of the upper block 10 is the same as that of the upper channel 23 (consisting of the linear channels and the bent channels) of the first unit block 20. As shown in FIG. 4 and FIG. 5, in a state that the upper block 10 is coupled with the fist unit block 20, the lower channel 13 of the upper block 10 and the upper channel 23 of the first unit block 20 correspond to each other to form the flow passage 100 as shown in FIG. 2.

A structure of the first bent channel 23a-1 consisting of the first and second branch channels 23a-1-1 and 23a-1-2 is applied to all the bent channels including the second bent channel 23b-1 and channels formed on all the unit blocks 30, 40 and 50.

Although only the first unit block 20 and the upper block 10 corresponding to the first unit block are shown in FIG. 4 and FIG. 5, the structure and function of the channels 33, 43 and 53 formed on a lower and upper surfaces of the unit blocks 30, 40 and 50 are the same as those of the channels 13 and 23 of the upper block and first unit block.

In the stack type reactor 500 as shown in FIG. 1, however, it is preferable that a structure of the branch channel in the upper channel is vertically and bilaterally symmetrical with that of the corresponding branch channel in the lower channel of each block as shown in FIG. 4 and FIG. 5 according to a flow direction of the raw substances flowed in the channels (the flow passage).

On the other hand, each of the first and second branch channels 23a-1-1 and 23a-1-2 of the channels formed on the upper block and the unit blocks has a bending portion formed at a mid portion thereof, not a curved portion with a curvature radius, and so the different kinds of the raw substances are uniformly mixed due to the above bending portion.

After the different kinds of the raw substances are mixed in the first linear channel 23a (that is, in the integral flow passages 111), the raw substance is dived and entered into the first and second branch channels 23a-1-1 and 23a-1-2. When the raw substance is gone through the bending portion, the raw substances flowing through the first and second branch channels 23a-1-1 and 23a-1-2 become the turbulence flow, and so the raw substance can be more effectively mixed due to a turbulence flow.

Figure 6:
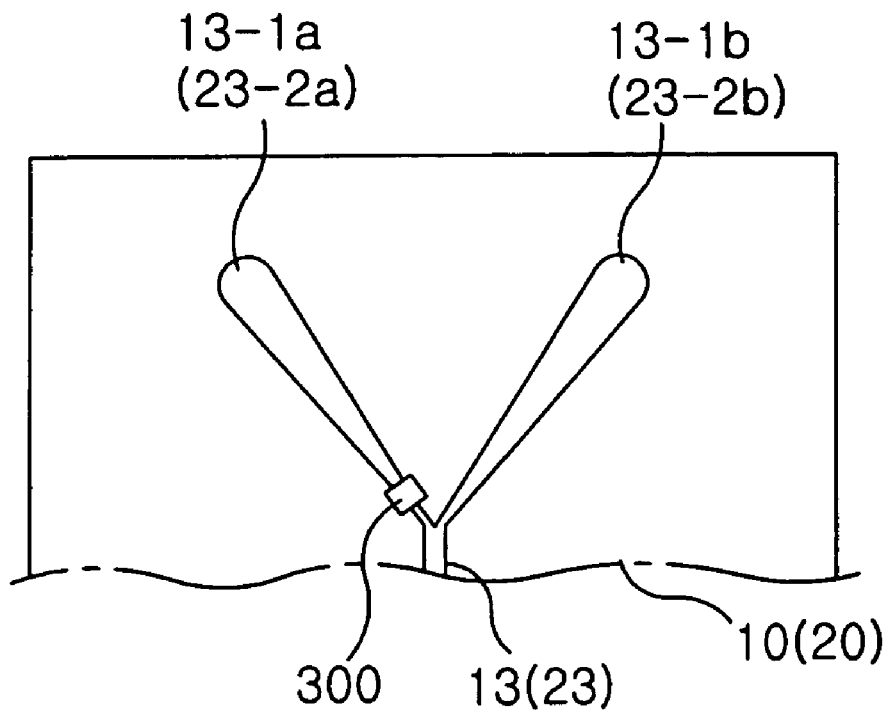
FIG. 6 is a partial plane view of "E" portion of FIG. 1 and shows in detail connecting channels connected to an upper channel of the first unit block.

FIG. 6 is an enlarged plane view of the portion "E" in FIG. 1 and shows the connecting channels constituting the upper channel of the first unit block. As described above, the raw substances entered through the inlets 11 and 12 of the upper block 10 pass through the extended flow passages 11-1 and 12-1 of the upper block 10 and are then entered in the flow passage (100 in FIG. 2) formed by the upper channel 13 of the upper block 10 and the upper channel 23 of the first unit block 20.

The different raw substances (solutions) maintain their optimum concentrations, and so a flow rate of each raw substrate is determined according to the concentration of the raw substance. In order to mix and react optimally two kinds of raw substances or more to the prescribed equivalent, it is preferable that there is no difference among the flow rates of the raw substances or a difference among the flow rates of the raw substances is minimized.

For example, in the litigation reaction, in a case that tetrahydrofuran(THF; solution) which is entered at a high flow rate is combined with butyl lithium entered at a low flow rate, sediment of lithium hydroxide is accumulated in the outlet through which butyl lithium is discharged at a low flow rate.

As a result, the raw substance is not supplied smoothly, and so a mixture and a reaction between the raw substances are not generated.

In the present invention in order to solve the above problem, the connecting channels 13-1a and 13-1 formed on the upper block 10 and the connecting channels 23-2a and 23-2b formed on the first unit block 20 are formed such that a width of each connecting channel is different along the its entire length.

That is, as shown in FIG. 6, a width of each of the connecting channels 13-1a and 13-1b, 23-2a and 23-2b connecting the inlets 11 and 12 of the upper block 10 to the flow passage formed by the channels 13 and 23 is gradually decreased toward the channels 13 and 23 of the blocks 10 and 20.

Accordingly, sectional surface areas of the flow passages formed by the connecting channels 13-1a, 23-2a and 13-1b, 23-2b when the upper block 10 and the first unit block 20 are coupled are gradually toward the flow passage formed by the channels 13 and 23. Consequently, a flow rate of the raw substance flowed in the flow passage formed by the connecting channels 13-1a and 23-2a becomes same as that of another raw substance flowed in the flow passage formed by the connecting channels 13-1b and 23-2b at the inlet of the flow passage formed by the channels 13 and 23 of the upper block 10 and the first unit block 20.

Figure 7:
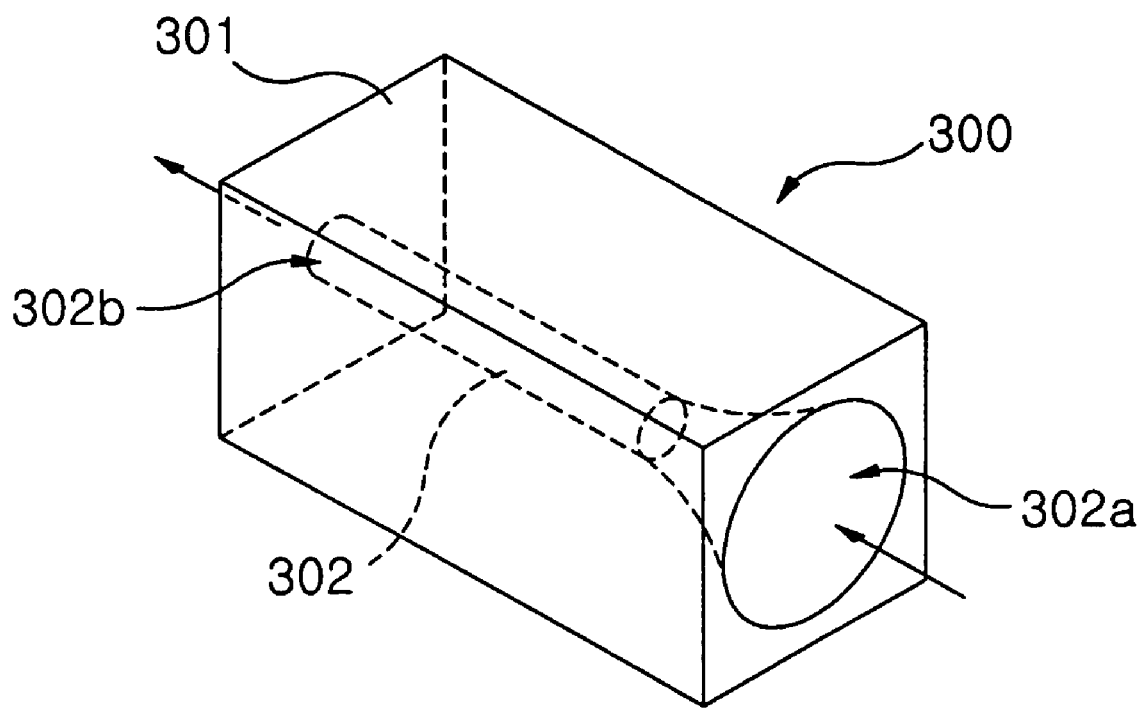
FIG. 7 is a perspective view of a flow rate adjusting module mounted in the connecting channel.

FIG. 7 is a perspective view of a flow rate adjusting member 300 provided in the flow passage formed by one connecting channel (for example, 13-1a) of the upper block 10 and one connecting channel (for example, 23-2a) of the first unit block 20.

Such flow rate adjusting member 300 consists of a main body 301 and a flow passage 302 penetrating the main body 301, the flow passage 302 has an outlet 302b and an inlet 301 having a sectional surface area larger than that of the outlet 302.

If the flow rate adjusting member 300 having the structure as described above is provided in any one flow passage formed by two corresponding connecting channels (for example, 13-1a and 23-2a) through which the raw substance is flowed at a low flow rate, this raw substance passes through the flow passage 302 of the flow rate adjusting member 300, and so a flow rate of the raw substance is increased at the outlet 302b of the flow rate adjusting member 300. Consequently, it is possible to adjust the flow rates of both raw substances entered into the flow passage 100 formed by upper block 10 and the first unit block 20 to the same value.

Figure 8:
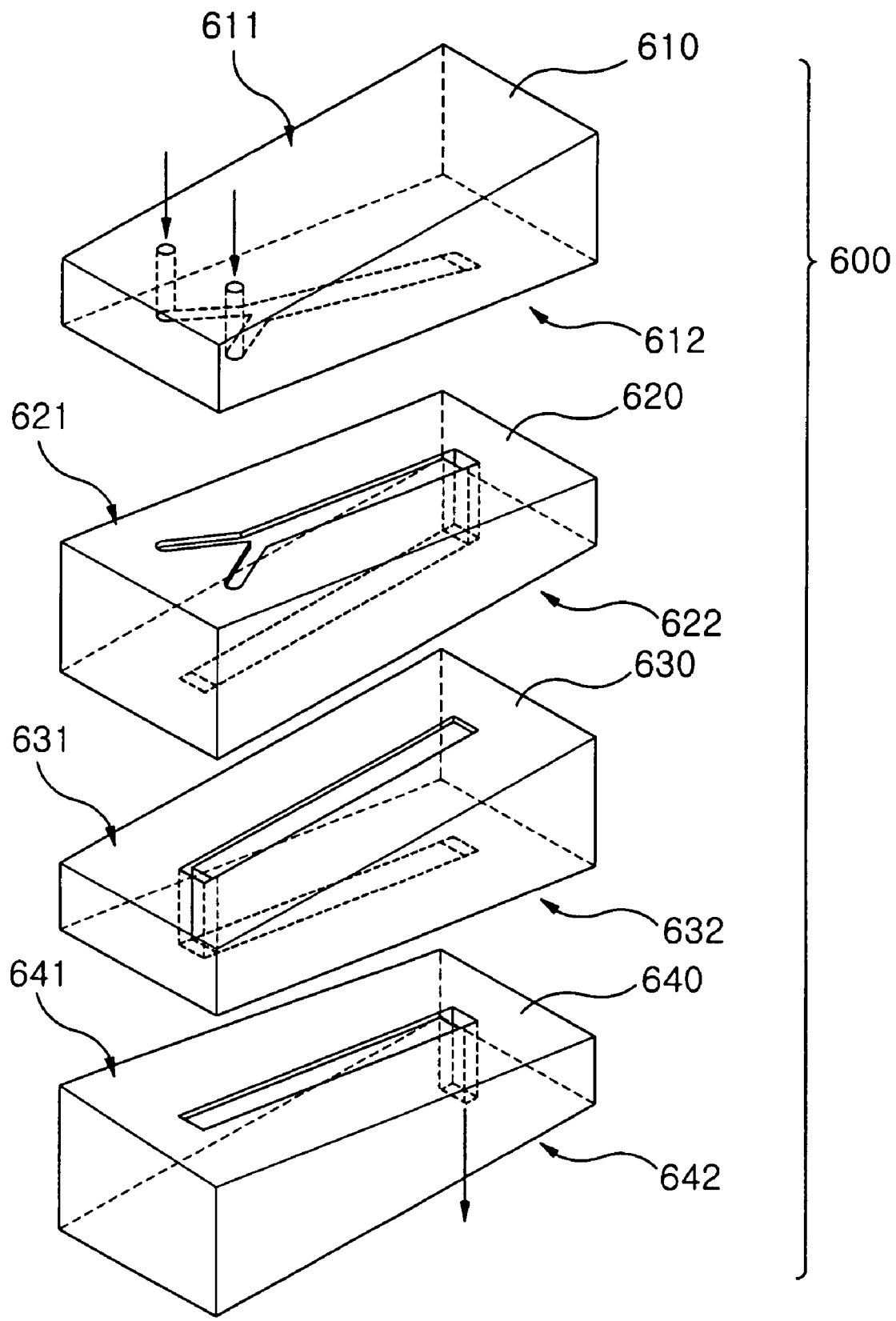
FIG. 8 is an exploded perspective view showing blocks constituting the stack type reactor according to the second embodiment of the present invention.

FIG. 8 is an exploded perspective view showing the blocks constituting the reactor according to the second embodiment of the present invention. Like the reactor 500 illustrated in Fig, 1, the reactor 600 according to this embodiment comprises an upper block 610, a plurality of unit blocks 620, 630 and 640 and a plurality of gaskets. On the other hand, the gaskets are not illustrated in FIG. 8.

The structures and functions of the upper block 610 and the unit blocks 620, 630 and 640 are the same as those of the upper block 10 and the unit blocks 20, 30, 40 and 50 in the first embodiment and the configurations and the functions of channels formed on the blocks 610, 620, 630 and 640 are also the same as those of the channels formed on the block 10, 20, 30, 40 and 50 shown in FIG. 1. Accordingly, the description thereon is omitted.

The most important feature of the stack type reactor 600 according to this embodiment of the present invention is that each of the blocks 610, 620, 630 and 640 has inclined surfaces.

As shown in FIG. 8, each block (for example, the first unit block 620) has an inclined upper surface 621 and a lower surface 622 inclined in the opposite direction to the direction of inclination of the upper surface 621. Also, each surface (a lower surface or upper surface) of each block is inclined in the same direction as the inclination direction of the corresponding surface of the block to be coupled therewith.

At this time, an inclination direction of the surface of each of the blocks 610, 620, 630 and 640 is decided such that the raw substance flowed along the flow passage (that is, the channels formed on the blocks) should be flowed downward.

Accordingly, the downward inclined flow passages are formed in the reactor 600 consisting of the blocks 610, 620, 630 and 640 due to the inclined surfaces. Due to the inclined flow passages, it is possible to obtain the advantages as follows.

The sediment is generated together with the resulting reactant by a reaction of the raw substances, this sediment is discharged out of the reactor along the resulting reactant. However, a portion of the sediment is remained in the flow passage.

If the reactor is operated for long time without cleaning or repairing, the sediment is gradually accumulated and this the accumulated sediment obstructs a smooth flow of raw substance. Accordingly, the raw substances or the resulting reactant can be stagnated, and a reaction itself between the raw substances cannot be progressed due to the extreme stagnation of the raw substances or the resulting reactant.

By forming the upper surfaces 611, 621, 631 and 641 and the lower surfaces 612, 622, 632 and 642 of the blocks 610, 620, 630 and 640 as the inclined surfaces, as shown in FIG. 8, the flow passage formed by coupling two blocks has the inclined structure, and so a flow rate of the raw substance (or the resulting reactant) flowed in the inclined flow passage is higher than that of the raw substance flown in the horizontal flow passage.

Accordingly, the sediment existed in the flow passage is flowed along with the raw substance (or the resulting reactant) flowed at a high flow rate so that it is possible to prevent the sediment being accumulated in the flow passage.

In the reactor according to the present invention as described, a reaction time and a reaction path can be adjusted properly by the number of the blocks constituting the reactor according to the raw substances having the different reaction time, and so the optimal reaction can be induced.

Also, due to the inclined flow passage through which the raw substance (or the resulting reactant) is flowed, it is possible to improve the problem of accumulating the sediment in the flow passage.

The preferred embodiments of the present invention have been described for illustrative purposes, and those skilled in the art will appreciate that various modifications, additions, and substitutions are possible, without departing from the scope and spirit of the present invention as disclosed in the accompanying claims.

What is claimed is:

1. A stack type reactor, comprising:
    an upper block including at least two inlets through which different kinds of raw substances are entered and a lower channel communicated in fluid with the inlets and formed a lower surface thereof; and
    an unit block including an upper channel corresponding to the lower channel of the upper block and formed on an upper surface thereof, the unit block including a lower channel formed a lower surface thereof and communicated in fluid with the upper channel via a connecting flow passage penetrating therethrough,
    the upper block and the unit block being coupled with each other to form a flow passage acting as a flow path of the raw substances by corresponding to the lower channel of the upper block and the upper channel of the first unit block.

2. The stack type reactor of claim 1, wherein the upper block further comprises at least two connecting channels connecting each inlet and the lower channel, and the unit block further comprises at least tow connecting channel corresponding to the connecting channels of the upper block, each connecting channel has a width gradually decreased from the inlet toward the upper channels of the unit block and the upper block.

3. The stack type reactor of claim 2, further comprising a flow rate adjusting member provided at an outlet of flow passage formed by one of the connecting channel of the upper block and the corresponding connecting channel of the unit block for increasing a flow rate of raw substance which is flowed at a lower flow rate.

4. The stack type reactor of claim 3, wherein the flow rate adjusting member comprises a main body and a flow passage penetrating the main body, the flow passage has an inlet and an outlet having a sectional surface area smaller than that of the inlet.

5. The stack type reactor of claim 1, further comprising at least one auxiliary unit block having an upper channel formed on an upper surface thereof and corresponding to a lower channel formed on a lower surface of the neighboring block and a lower channel communicated in fluid with the upper channel thereof via a connecting flow passage, the flow passage of the auxiliary unit block being formed at one end of the channel opposite to an end of the channel of the neighboring unit block at which the flow passage is formed.

6. The stack type reactor of claim 5, wherein each of the channel has a catalyst layer formed thereon.

7. The stack type reactor of claim 5, wherein each of the upper channel and the lower channel of each unit block comprises a plurality of linear channels and bent channels connecting two neighboring linear channels, each bent channel consists of a first and second branch channels diverged from one linear channel, the branch channels are extended at a certain interval and joined at the other linear channel through outlets.

8. The stack type reactor of claim 7, wherein each of the first and second branch channels has a portion bent toward the linear channel.

9. The stack type reactor of claim 8, wherein the first branch channel of the upper channel of each block is divided into an upward inclined area from the adjacent linear channel to a bending point and a flat area from the bending point to another adjacent linear channel, the flat area has a protrusion formed at a portion thereof, the branch channel of the lower channel of another block corresponding the upper channel of each unit block is divided into an upward inclined area corresponding the upward inclined area of the first branch channel of the upper channel and a downward declined area corresponding to the flat area, the second branch channel of the upper channel of each unit block is divided into a downward inclined area from the adjacent linear channel to a bending point and a upward inclined area from the bending point to another adjacent linear channel, and the branch channel of the lower channel of another block corresponding the upper channel of each unit block is divided into a downward inclined area corresponding the downward inclined area of the second branch channel of the upper channel and a flat area corresponding to the upward inclined area of the second branch channel, the flat area has a protrusion formed at a portion thereof.

10. The stack type reactor of claim 9, wherein an inlet of each branch channel has a width which is a half of a width of the corresponding linear channel, an outlet of each branch channel has a width which is the same as that of the corresponding linear channel, the outlet of the first branch channel corresponds to an upper side of the corresponding linear channel and the outlet of the second branch channel corresponds to the corresponding linear channel.

11. The stack type reactor of claim 9, wherein the branch channel of each bent channel constituting the lower channel of each block has a structure which is vertically and bilaterally symmetrical with that of the corresponding branch channel of the bent channel constituting the upper channel.

12. The stack type reactor of claim 1, wherein the flow passage formed by the upper channel and the lower channel of two coupled blocks comprises at least two integral flow passages and at least one connecting flow passage connecting two integral flow passages, the connecting flow passage consists of a first and second branch flow passages diverged from one integral flow passage, the first and second branch flow passages are extended at a certain interval and outlets of two branch flow passages are joined at the other liner flow passage.

13. The stack type reactor of claim 12, wherein each of the first and second branch flow passages has a portion bent toward the linear flow passage.

14. The stack type reactor of claim 12, wherein the first branch flow passage has a shape such an area between an inlet and the bent point is upward inclined and an area between the bent point and an outlet is downward inclined, the second branch flow passage has a shape such an area between an inlet and the bent point is downward inclined and an area between the bent point and an outlet is upward inclined.

15. The stack type reactor of claim 12, wherein each of the first and second branch flow passages has an inlet connected to one linear flow passage and having a width which is a half of a width of the conned linear flow passage, an outlet connected to the other linear flow passage and having a width which is the same as that of the connected linear flow passage, and the outlet of the first branch flow passage corresponds to an upper side of the corresponding linear flow passage and the outlet of the second branch flow passage corresponds to the corresponding linear passage such that the outlet of the second branch flow passage is placed below the outlet of the first flow passage.

16. The stack type reactor of claim 2, further comprising a plurality of gaskets, each gasket being placed between two blocks to prevent the raw substance being leaked to an exterior.

17. The stack type reactor of claim 16, wherein each gasket is a flat shaped member and having an opening corresponding to the channel formed on the block.

18. The stack type reactor of claim 5, wherein each block is formed such that the upper surface is inclined in the opposite direction to the direction of inclination of the lower surface, and each surface of each block is inclined in the same direction as that of the corresponding surface of the block coupled thereto.

19. The stack type reactor of claim 18, wherein the inclination direction of the upper and lower surfaces of each block is determined such that the raw substance can be flowed downward along the flow passage formed by the channels of the blocks.

* * * * *